United States Patent
Terauchi (12)

(10) Patent No.: US 6,211,715 B1
(45) Date of Patent: *Apr. 3, 2001

(54) SEMICONDUCTOR INTEGRATED CIRCUIT INCORPORATING THEREIN CLOCK SUPPLY CIRCUIT

(75) Inventor: Youji Terauchi, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,919

(22) Filed: Mar. 30, 1998

(30) Foreign Application Priority Data

Mar. 31, 1997 (JP) .................................. 9-097500

(51) Int. Cl.⁷ ...................................... G06F 1/04
(52) U.S. Cl. ........................................ 327/295; 327/115
(58) Field of Search ...................... 327/115, 117, 327/291, 293, 295, 296, 297, 299, 144, 145

(56) References Cited

U.S. PATENT DOCUMENTS

| | | | | |
|---|---|---|---|---|
| 4,081,755 | * | 3/1978 | Howard | 327/48 |
| 4,163,946 | * | 8/1979 | Alberts | 327/160 |
| 4,500,909 | * | 2/1985 | Machida | 348/521 |
| 5,043,596 | * | 8/1991 | Masuda et al. | 327/297 |
| 5,317,601 | * | 5/1994 | Riordan et al. | 375/107 |
| 5,389,826 | * | 2/1995 | Sonobe | 327/115 |
| 5,568,078 | * | 10/1996 | Lee | 327/262 |
| 5,774,511 | * | 6/1998 | Boerstler | 375/376 |

FOREIGN PATENT DOCUMENTS

| | | |
|---|---|---|
| 59-011423 | 1/1984 | (JP) . |
| 3-186912 | 8/1991 | (JP) . |
| 3-286213 | 12/1991 | (JP) . |
| 5-053681 | 3/1993 | (JP) . |
| 5-081447 | 4/1993 | (JP) . |
| 6-083616 | 3/1994 | (JP) . |

* cited by examiner

*Primary Examiner*—Timothy P. Callahan
*Assistant Examiner*—Hai L. Nguyen
(74) *Attorney, Agent, or Firm*—Foley & Lardner

(57) ABSTRACT

A semiconductor integrated circuit incorporating therein a clock supply circuit drives a plurality of peripheral circuits using different frequency-divided clocks. In order to avoid enlargement of switching current there is provided a frequency-dividing circuit for dividing external clock supplied from a clock supply terminal, and a plurality of peripheral circuits which are operated by frequency-divided clocks. There is provided a first clock supply circuit which is capable of generating frequency-divided clock with the highest frequency among frequency-divided clocks required by the peripheral circuits, and a plurality of second clock supply circuits for generating frequency-divided clocks from frequency-divided clock of the first clock supply circuit. Wiring to connect the first clock supply circuit to second clock supply circuits becomes short, and the number of wiring is reduced. Therefore it becomes possible to reduce the switching current.

32 Claims, 15 Drawing Sheets

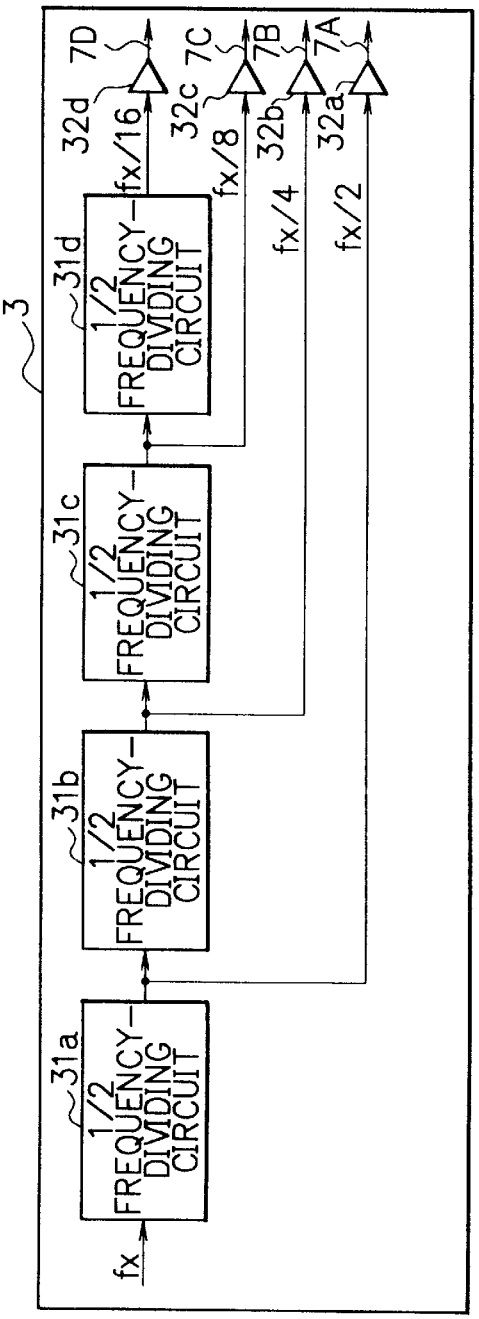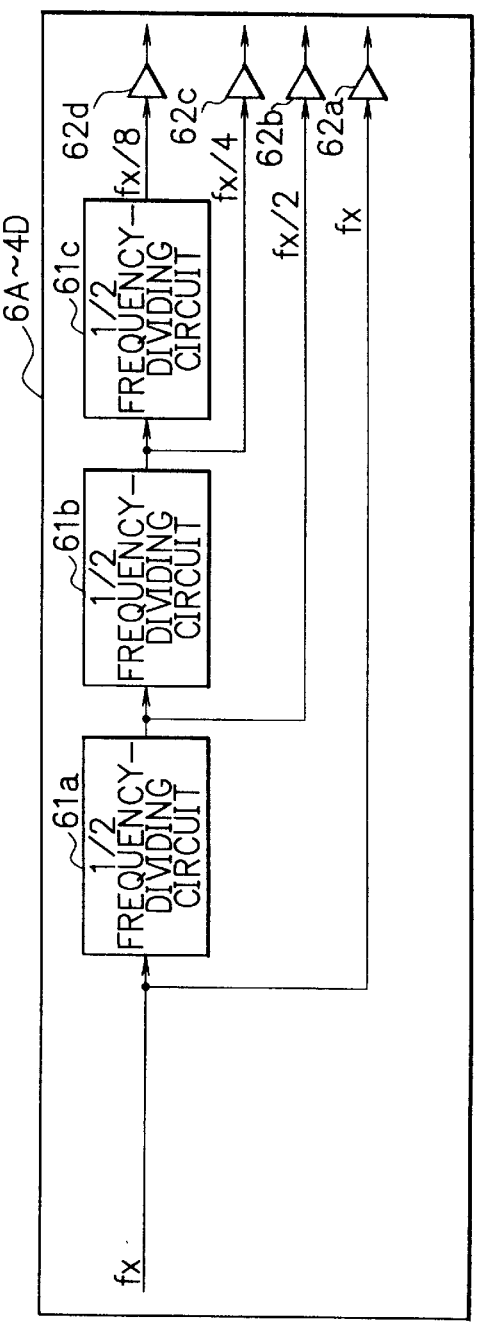

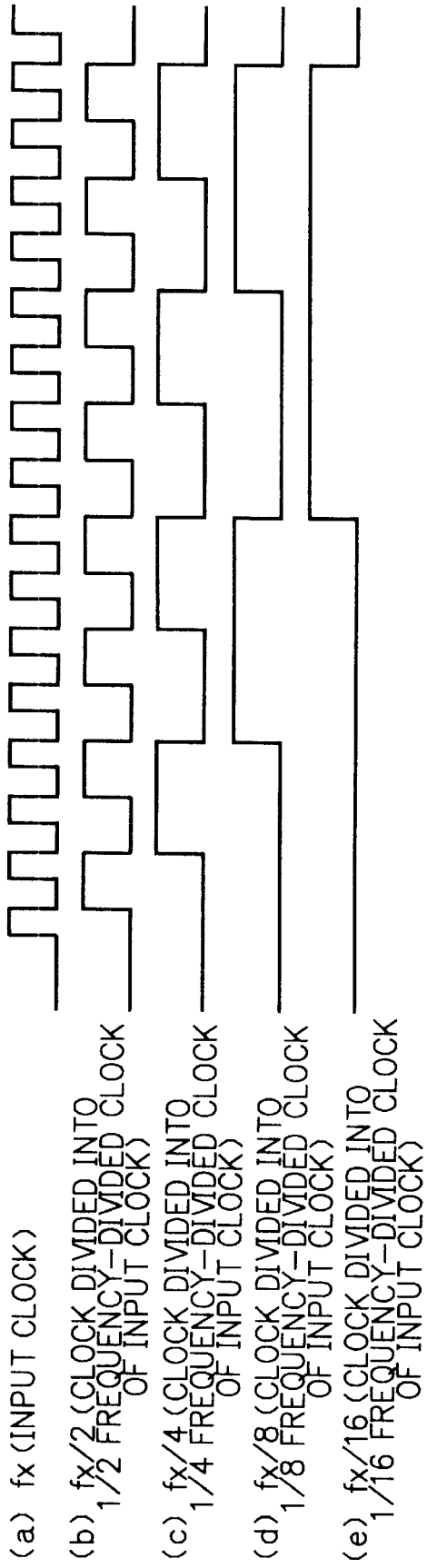
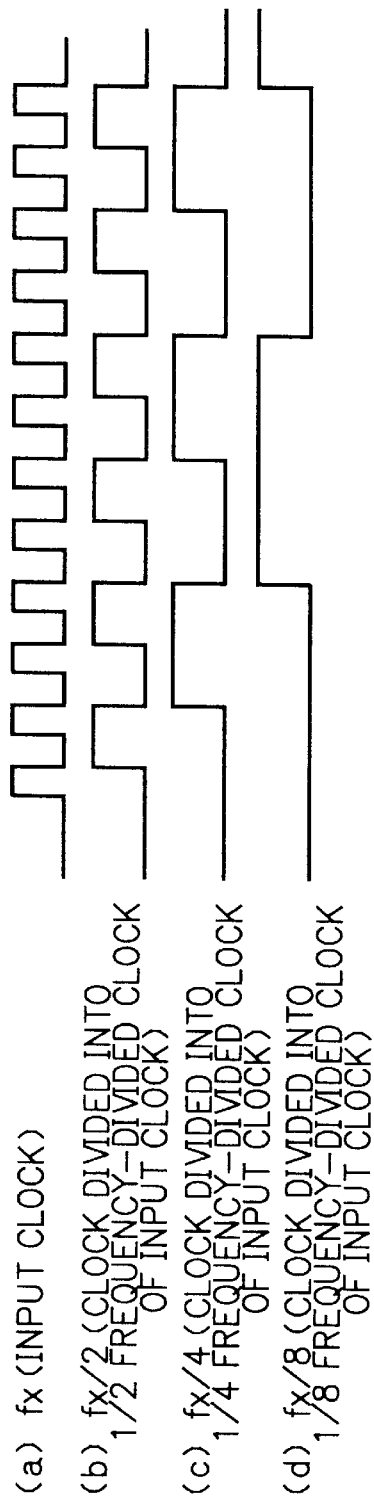

FIG. 8A (a) fx (INPUT CLOCK)
(b) fx/2 (CLOCK DIVIDED INTO 1/2 FREQUENCY-DIVIDED CLOCK OF INPUT CLOCK)
(c) fx/4 (CLOCK DIVIDED INTO 1/4 FREQUENCY-DIVIDED CLOCK OF INPUT CLOCK)
(d) fx/8 (CLOCK DIVIDED INTO 1/8 FREQUENCY-DIVIDED CLOCK OF INPUT CLOCK)
(e) fx/16 (CLOCK DIVIDED INTO 1/16 FREQUENCY-DIVIDED CLOCK OF INPUT CLOCK)

FIG. 8B (a) fx (INPUT CLOCK)
(b) fx/2 (CLOCK DIVIDED INTO 1/2 FREQUENCY-DIVIDED CLOCK OF INPUT CLOCK)
(c) fx/4 (CLOCK DIVIDED INTO 1/4 FREQUENCY-DIVIDED CLOCK OF INPUT CLOCK)
(d) fx/8 (CLOCK DIVIDED INTO 1/8 FREQUENCY-DIVIDED CLOCK OF INPUT CLOCK)

F I G. 9
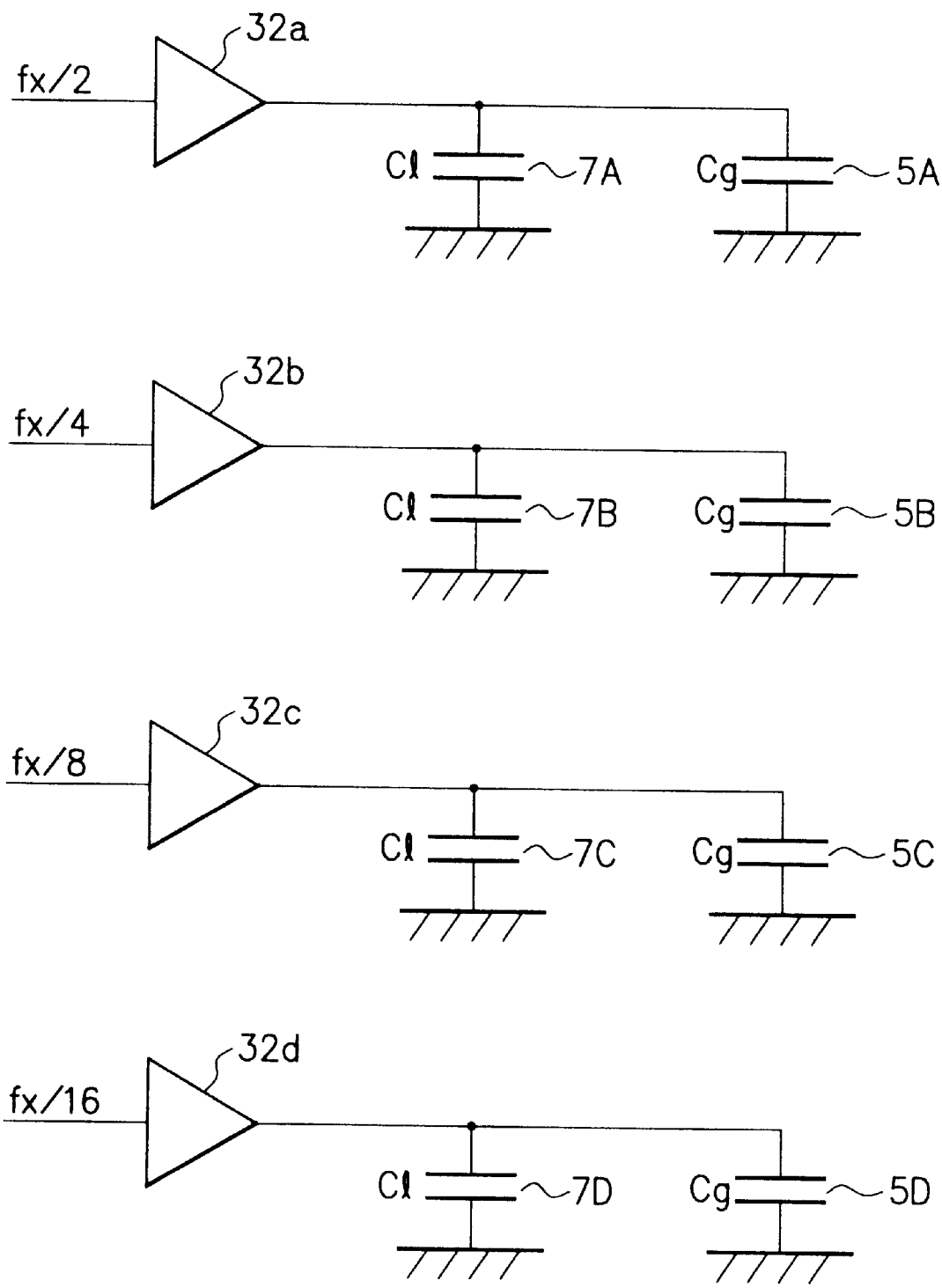

FIG. 12
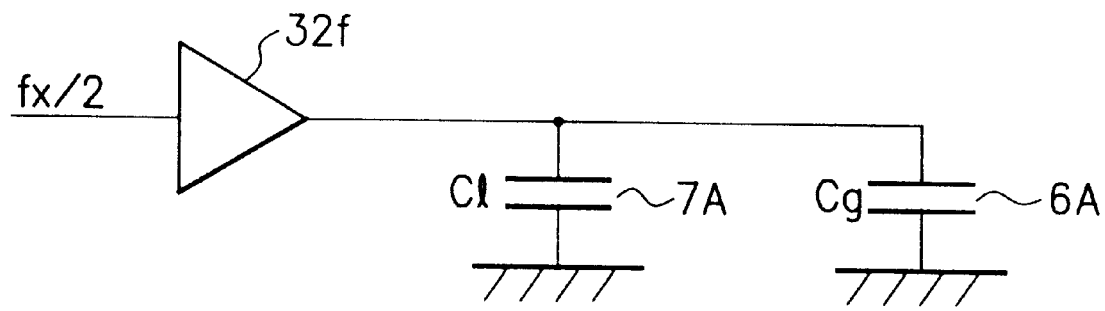
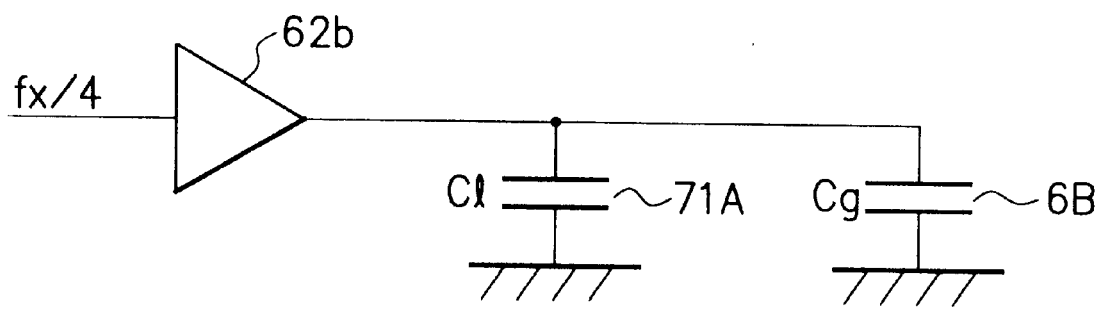
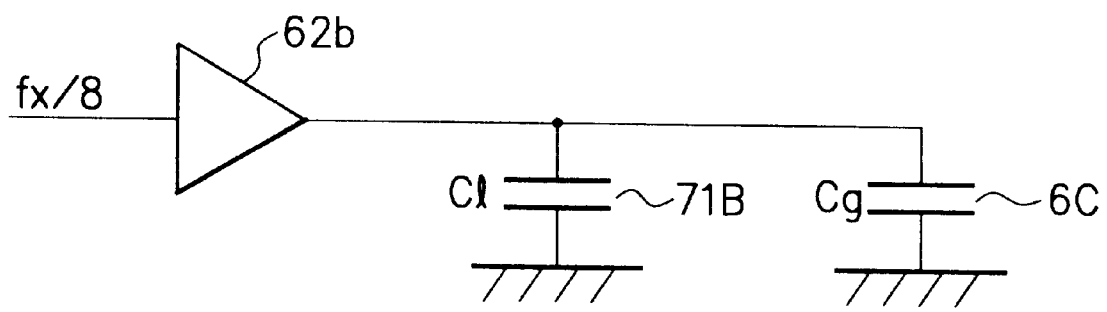
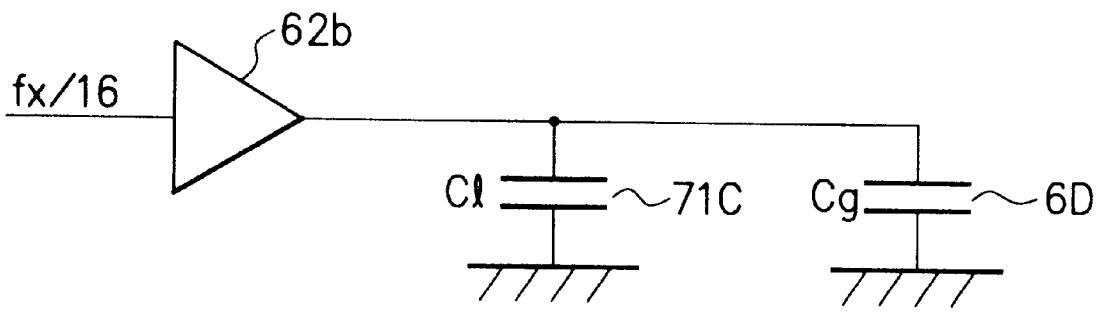

FIG. 15
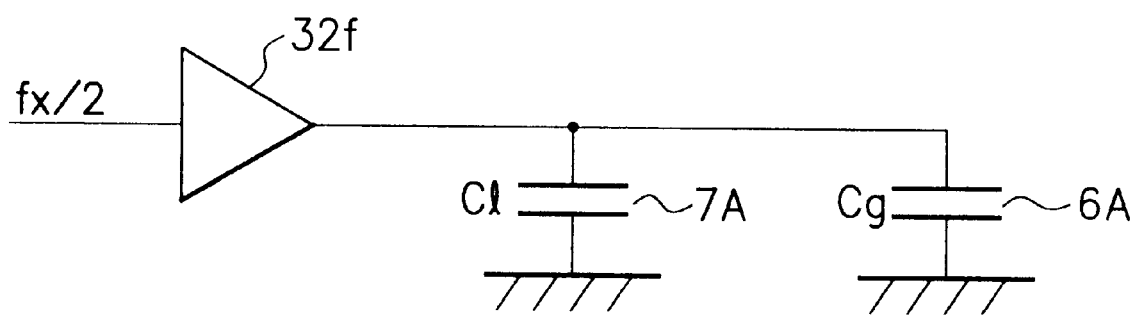
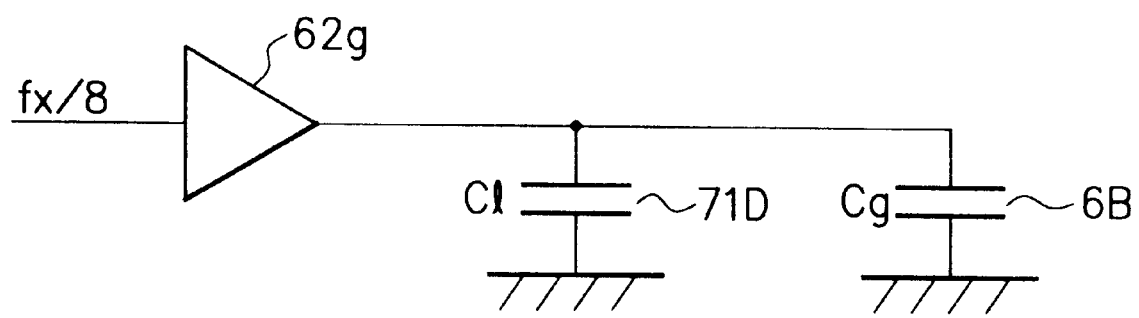

SEMICONDUCTOR INTEGRATED CIRCUIT INCORPORATING THEREIN CLOCK SUPPLY CIRCUIT

BACKGROUND OF THE INVENTION

The present invention relates to a semiconductor integrated circuit operated by a clock signal (hereinafter referring to as a clock). More particularly, this invention relates to a semiconductor integrated circuit into which a clock supply circuit is incorporated.

DESCRIPTION OF THE PRIOR ART

In a semiconductor integrated circuit such as single-micro chip computer which is operated by a clock, a clock corresponding to operation of a plurality of peripheral circuits provided within the circuit is required. For this reason, it is required that it causes clock inputted from external section to convert into clock with frequency which is required at respective peripheral circuits. As shown in FIG. 1, for example, Japanese Patent Application Laid-Open No. HEI 3-286213 discloses such a technology. A semiconductor integrated circuit 1A disclosed therein comprises a first peripheral circuit 5A, a second peripheral circuit 5B, a third peripheral circuit 5C, and a fourth peripheral circuit 5D, a clock supply terminal 2 to which an external clock is supplied, and a clock supply circuit 3X for supplying the supplied clock to respective peripheral circuits 5A, 5B, 5C, and 5D. Respective peripheral circuits 5A to 5D are connected to the clock supply circuit 3X by wiring 9. FIG. 2 is a block diagram of the clock supply circuit 3X. The clock supply circuit 3X comprises a plurality of 1/2 frequency-dividing circuits 33 and clock drivers 34. Respective clock drivers 34 possess current driving capability in answer to load capacity of respective clocks.

In the semiconductor integrated circuit 1A, the clock supplied from the clock supply terminal 2 is divided into frequency-divided clock with frequency-divided ratio of 1/2, 1/4, 1/8, 1/16, 1/32, 1/64, or 1/128 by selectively taking the output out from respective 1/2 frequency division circuits 33 with cascade connection in the clock supply circuit 3X. The frequency-divided clock is supplied as respective required clocks at the above-described respective peripheral circuits 5A to 5D through the above-described wiring from the clock supply circuit 3X.

FIG. 3 is a block diagram showing a semiconductor integrated circuit 1B which is provided with a clock supply circuit which is different from the clock supply circuit 3X of FIG. 1. The semiconductor integrated circuit 1B comprises a plurality of peripheral blocks 4A, 4B, 4C, and 4D. A peripheral block 4A comprises a peripheral circuit 5A, and a clock supply circuit 6A. A peripheral block 4B comprises a peripheral circuit 5B and a clock supply circuit 6B. A peripheral block 4C comprises a peripheral circuit 5C and a clock supply circuit 6C. A peripheral block 4D comprises a peripheral circuit 5D and a clock supply circuit 6D. The clock supply circuit of respective blocks is connected to a clock supply terminal 2 through wiring 10 and a clock driver 8. In this semiconductor integrated circuit, the clock supplied from the clock supply terminal 2 is divided into frequency-divided clock with required frequency-divided ratio at the respective peripheral circuits 5A, 5B, 5C, or 5D in the respective clock supply circuits 6A, 6B, 6C, or 6D of the respective peripheral blocks 4A, 4B, 4C, or 4D to be supplied.

Now, in the above-described semiconductor integrated circuit as the conventional first technology shown in FIG.1, since it causes the clock with each different frequency-divided ratio to supply to the respective peripheral circuits 5A to 5D from one clock supply circuit 3X through respective independent wirings, wiring length for transmitting clock is increased and, thus it is an obstacle to high integration of the semiconductor integrated circuit. Further, the wiring for transmitting clock with high frequency becomes long, and that fan out is numerous in the clock supply circuit, thus there is the problem that switching current becomes large.

In the semiconductor integrated circuit as the conventional second technology shown in FIG. 3, above-described problem of wiring length is loosened. However, it causes the clock with the highest frequency being in use at respective peripheral circuit 5A to 5D to supply to respective peripheral block 4A to 4D from the clock driver 8 to implement frequency dividing at the clock supply circuits 6A to 6D of respective peripheral blocks, thereby, the wiring of high frequency clock being in use at respective peripheral block becomes long, and fan out is numerous, there is also the problem that switching current becomes large.

SUMMARY OF THE INVENTION

In view of the foregoing, it is an object of the present invention for achieving the above-mentioned object to provide a semiconductor integrated circuit which is provided with a clock supply circuit with low dissipation power, reducing switching current.

In accordance with one aspect of the present invention, for achieving the above-mentioned object, there is provided a semiconductor integrated circuit with a clock supply circuit having a plurality of peripheral circuits operated by frequency-divided clock, while dividing clock supplied from external section, the semiconductor integrated circuit comprises a first clock supply circuit which is capable of generating frequency-divided clock with the highest frequency among required frequency-divided clocks in the respective peripheral circuits, and a second clock supply circuit for generating frequency-divided clock which is required at the respective peripheral circuits from the frequency-divided clock of the first clock supply circuit. Preferably, there is provided a semiconductor integrated circuit with a clock supply circuit, wherein the first clock supply circuit is constituted as one clock supply circuit common to whole the plurality of peripheral circuits, and the second clock supply circuits are provided with corresponding to the respective peripheral circuits, thus generating frequency-divided clock required for respective corresponding peripheral circuits.

In accordance with another aspect of the present invention there is provided a semiconductor integrated circuit with a clock supply circuit, wherein the frequency-divided clock from the first clock supply circuit is supplied parallel to the respective second clock supply circuits, and the frequency-divided clock is supplied to respective corresponding peripheral circuits from the respective second clock supply circuits. Preferably, there is provided a semiconductor integrated circuit with a clock supply circuit wherein said respective second clock supply circuits are connected in cascade connection state, the frequency-divided clock from the first clock supply circuit is supplied to a first stage of the second clock supply circuit corresponding to the first peripheral circuit, then the frequency-divided clock from the second clock supply circuit is supplied to a second stage of the second clock supply circuit corresponding to the second peripheral circuit, hereinafter generally, the frequency-divided clock from a (n)-th stage of the second clock supply circuit is supplied in order to a (n+1)-th stage of the second clock supply circuit. Preferably, there is provided a semiconductor integrated circuit with a clock supply circuit, wherein a plurality of peripheral circuits divided into blocks in every smaller number than number of said plurality of peripheral circuits, a second clock supply circuit is provided corresponding to the respective blocks, the second clock supply circuit supplies the frequency-divided clock to respective peripheral circuits in the blocks.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 7A is block diagrams showing the first clock supply circuits of FIG. 6;

FIG. 7B is block diagrams showing the second clock supply circuits of FIG. 6;

FIG. 8A is a timing chart showing operation of the first clock supply circuits;

FIG. 8B is a timing chart showing operation of the second clock supply circuits;

FIG. 9 is an equivalent circuit view of the semiconductor integrated circuit of FIG. 6;

FIG. 12 is an equivalent circuit view showing a semiconductor integrated circuit of FIG. 10;

FIG. 15 is an equivalent circuit of the semiconductor integrated circuit of FIG. 13.

DETAILED DESCRIPTION OF THE PREFERRED EMBODIMENTS

A preferred embodiment of the invention will now be described in detail referring to the accompanying drawings.

Figure 6:
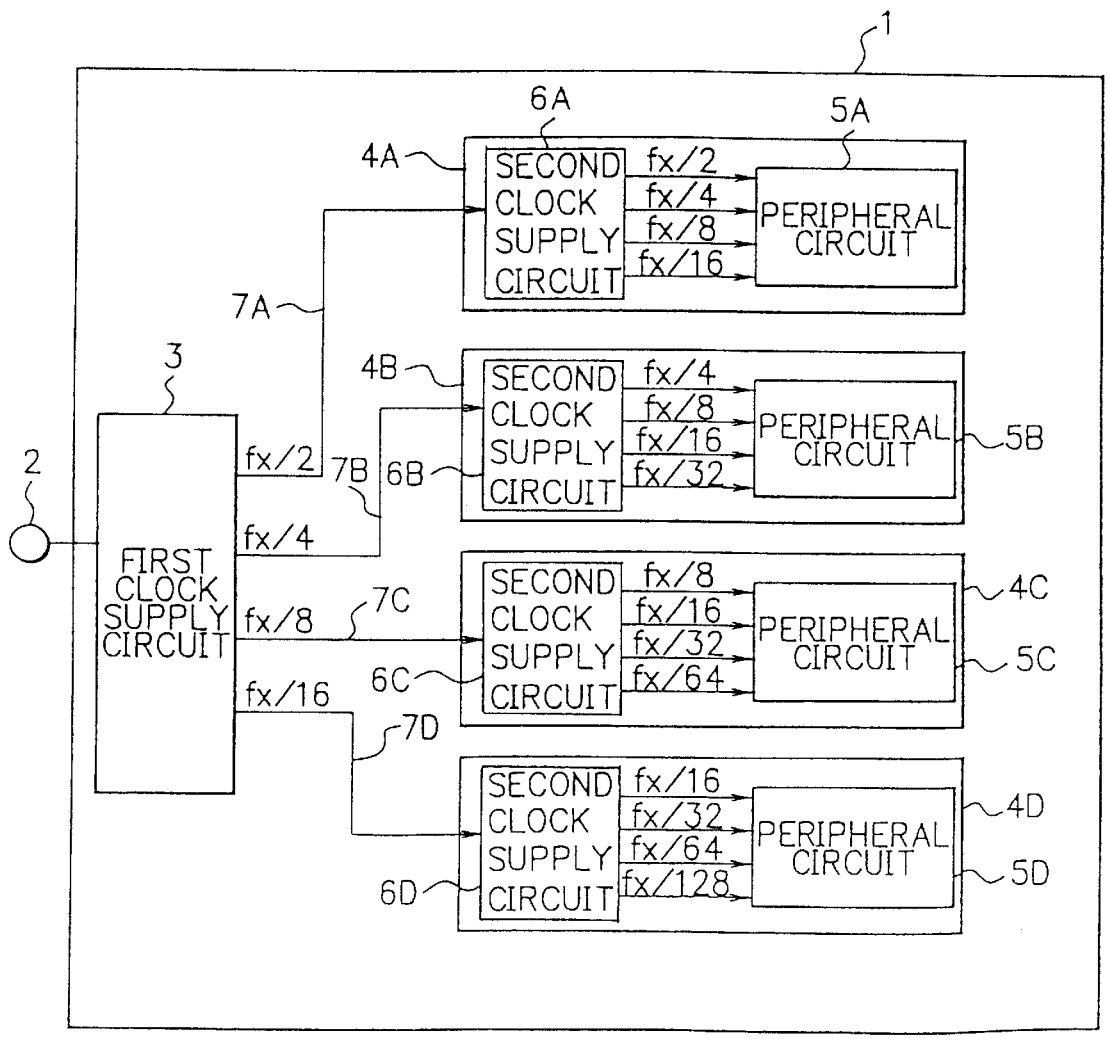
FIG. 6 is a block diagram showing a first embodiment of a semiconductor integrated circuit according to the present invention.

FIG. 6 is a block diagram showing a semiconductor integrated circuit incorporating therein a clock supply circuit of a first embodiment according to the present invention. In FIG. 6, reference numeral 1 denotes a semiconductor integrated circuit, which comprises a clock supply terminal 2 to which clock is supplied from an external section, a first clock supply circuit 3 which divides clock supplied from the clock supply terminal 2 into frequency-divided clock, a first peripheral block 4A, a second peripheral block 4B, a third peripheral block 4C, and a fourth peripheral block 4D. The first peripheral block 4A comprises a first peripheral circuit 5A consisting of a timer and a serial interface and so forth, and a second clock supply circuit 6A dividing clock received from the clock supply circuit 3 into frequency-divided clock. The second peripheral block 4B comprises a second peripheral circuit 5B consisting of a timer and a serial interface and so forth, and a second clock supply circuit 6B dividing clock received from the first clock supply circuit 3 into frequency-divided clock. The third peripheral block 4C comprises a third peripheral circuit 5C consisting of a timer and a serial interface and so forth, and a second clock supply circuit 6C dividing clock received from the first clock supply circuit 3 into frequency-divided clock. The fourth peripheral block 4D comprises a fourth peripheral circuit 5D consisting of a timer and a serial interface and so forth, and a second clock supply circuit 6D dividing clock received from the first clock supply circuit 3 into frequency-divided clock. Here, the first peripheral circuit 5A is operated by the frequency divided clock of each of fx/2, fx/4, fx/8, or fx/16 in terms of an external input clock fx. The second peripheral circuit 5B is operated by the frequency-divided clock of each of fx/4, fx/8, fx/16, or fx/32 in terms of the external input clock fx. The third peripheral circuit 5C is operated by the frequency-divided clock of each of fx/8, fx/16, fx/32, or fx/64 in terms of the external input clock fx. Further, the fourth peripheral circuit 5D is operated by the frequency-divided clock of each of fx/16, fx/32, fx/64, or fx/128 in terms of the external input clock fx. A wiring 7A is connected from the first clock supply circuit 3 to the peripheral block 4A for supplying frequency-divided clock which is divided by the first clock supply circuit 3. A wiring 7A is connected from the first clock supply circuit 3 to the peripheral block 4A for supplying frequency-divided clock which is divided by the first clock supply circuit 3. A wiring 7B is connected from the first clock supply circuit 3 to the peripheral block 4B for supplying frequency-divided clock which is divided by the first clock supply circuit 3. A wiring 7C is connected from the first clock supply circuit 3 to the peripheral block 4C for supplying frequency-divided clock which is divided by the first clock supply circuit 3. A wiring 7D is connected from the first clock supply circuit 3 to the peripheral block 4D for supplying frequency-divided clock which is divided by the first clock supply circuit 3. Clock of the maximum speed of high frequency fx/2 being in use for the peripheral circuit 5A is supplied to the wiring 7A. Clock of the maximum speed of high frequency fx/4 being in use for the peripheral circuit 5B is supplied to the wiring 7B. Clock of the maximum speed of high frequency fx/8 being in use for the peripheral circuit 5C is supplied to the wiring 7C. Clock of the maximum speed of high frequency fx/16 being in use for the peripheral circuit 5D is supplied to the wiring 7D.

FIG. 7A is a block diagram showing the first clock supply circuit 3. In FIG. 7A, four frequency-dividing circuits 31a, 31b, 31c, and 31d by which inputted clock is subjected to 1/2 frequency-dividing are connected in a cascade connection. A clock driver 32a is connected in between the 1/2 frequency-dividing circuit 31a and the 1/2 frequency-dividing circuit 31b. A clock driver 32b is connected in between the frequency-dividing circuit 31b and the frequency-dividing circuit 31c. A clock driver 32c is connected between the frequency-dividing circuit 31c and the frequency-dividing circuit 31d. A clock driver 32d is connected to output terminal of the frequency-dividing circuit 31d. Current driving capability of the clock drivers 32a, 32b, 32c, and 32d are determined by load capacity of next stage. In the first clock supply circuit 3, the 1/2 frequency-dividing circuit 31a divides the input clock fx into fx/2 frequency-divided clock, thus supplying fx/2 frequency-divided clock to the second clock supply circuit 6A of the peripheral block 4A through the wiring 7A. The 1/2 frequency-dividing circuit 31b divides the fx/2 frequency-divided clock into fx/4 frequency-divided clock, thus supplying the fx/4 frequency-divided clock to the second clock supply circuit 6B of the peripheral block 4B through the wiring 7B. The 1/2-frequency-dividing circuit 31c divides the fx/4 frequency-divided clock into fx/8 frequency-divided clock, thus supplying the fx/8 frequency-divided clock to the second clock supply circuit 6C of the peripheral block 4C through the wiring 7C. The 1/2-frequency-dividing circuit 31d divides the fx/8 frequency-divided clock into fx/16 frequency-divided clock, thus supplying the fx/16 frequency-divided clock to the second clock supply circuit 6D of the peripheral block 4D through the wiring 7D.

FIG. 7B is a block diagram showing representative of the respective second clock supply circuits 6A, 6B, 6C, and 6D. In FIG. 7B, three frequency-dividing circuits 61a, 61b, and 61c by which inputted clock is subjected to 1/2 frequency-dividing are connected in a cascade connection. A clock driver 62a is connected to an input terminal of the frequency-dividing circuit 61a. A clock driver 62b is connected in between the frequency-dividing circuit 61a and the frequency dividing circuit 61b. A clock driver 62c is connected in between the frequency-dividing circuit 61b and the frequency-dividing circuit 61c. A clock driver 62d is connected to an output terminal of the frequency-dividing circuit 61c. The second clock supply circuit 6A divides inputted clock into 1/2, 1/4, 1/8 frequency-divided clocks to supply to the peripheral circuit 5A of the peripheral block 4A. The second clock supply circuit 6B divides inputted clock into 1/2, 1/4, 1/8 frequency-divided clocks to supply to the peripheral circuit 5B of the peripheral block 4B. The second clock supply circuit 6C divides inputted clock into 1/2, 1/4, 1/8 frequency-divided clocks to supply to the peripheral circuit 5C of the peripheral block 4C. The second clock supply circuit 6D divides inputted clock into 1/2, 1/4, 1/8 frequency-divided clocks to supply to the peripheral circuit 5D of the peripheral block 4D.

Operation of the semiconductor integrated circuit incorporating therein a clock supply circuit of the first embodiment constituted above will be described. FIG. 8A is a timing chart of the first clock supply circuit 3. The clock (a) which is inputted from the clock supply terminal 2 of the semiconductor integrated circuit 1 is divided into a clock (b) being 1/2 frequency of the clock (a) by the 1/2 frequency-dividing circuit 31a of the first stage at the first clock supply circuit 3. The clock (b) which is inputted from the 1/2 frequency-dividing circuit 31a of the semiconductor integrated circuit 1 is divided into a clock (c) being 1/4 frequency of the clock (a) by the 1/2 frequency dividing circuit 31b of the second stage at the first clock supply circuit 3. The clock (c) which is inputted from the 1/2² frequency-dividing circuit 31b of the semiconductor integrated circuit 1 is divided into a clock (d) being 1/8 frequency of the clock (a) by the 1/2 frequency dividing circuit 31c of the third stage at the first clock supply circuit 3. The clock (d) which is inputted from 1/2 frequency-dividing circuit 31c of the semiconductor integrated circuit 1 is divided into a clock (e) being 1/16 frequency of the clock (a) by the 1/2 frequency dividing circuit 31d of the fourth stage at the first clock supply circuit 3. The clock with only the maximum speed of 1/2 frequency thereof being in use for the peripheral circuit 5A is supplied to the peripheral block 4A which is connected through the wiring 7A. The clock with only the maximum speed of 1/4 frequency thereof being in use for the peripheral circuit 5B is supplied to the peripheral block 4B which is connected through the wiring 7B. The clock with only the maximum speed of 1/8 frequency thereof being in use for the peripheral circuit 5C is supplied to the peripheral block 4C which is connected through the wiring 7C. The clock with only the maximum speed of 1/16 frequency thereof being in use for the peripheral circuit 5D is supplied to the peripheral block 4D which is connected through the wiring 7D.

The clock which is supplied to the peripheral block 4A is inputted to the second clock supply circuit 6A. The clock which is supplied to the peripheral block 4B is inputted to the second clock supply circuit 6B. The clock which is supplied to the peripheral block 4C is inputted to the second clock supply circuit 6C. The clock which is supplied to the peripheral block 4D is inputted to the second clock supply circuit 6D. FIG. 8B is a timing chart of the second clock supply circuits 6A, 6B, 6C, or 6D. The clock which is supplied to the peripheral block 4A is divided into 1/2 frequency thereof shown in (b) of FIG. 8B being 1/2 frequency-divided clock of the input clock (a) by the 1/2 frequency-dividing circuit 61a at the first stage. The clock which is supplied to the peripheral block 4A is divided into 1/4 frequency thereof shown in (c) of FIG. 8B being 1/4 frequency-divided clock of the input clock (a) by the 1/2 frequency-dividing circuit 61b at the second stage. The clock which is supplied to the peripheral block 4A is divided into 1/8 frequency thereof shown in (d) of FIG. 8B being 1/8 frequency-divided clock of the input clock (a) by the 1/2 frequency-dividing circuit 61c at the third stage. The input clock (a) of FIG. 8B is fx/2 of FIG. 8A. Therefore these fx/2, fx/4, fx/8, and fx/16 frequency-divided clocks are supplied to the peripheral circuit 5A. These fx/4, fx/8, fx/16, and fx/32 frequency-divided clocks are supplied to the peripheral circuit 5B. These fx/8, fx/16, fx/32, and fx/64 frequency-divided clocks are supplied to the peripheral circuit 5C. These fx/16, fx/32, fx/64, and fx/128 frequency-divided clocks are supplied to the peripheral circuit 5D.

Next, with respect to a switching current in the semiconductor integrated circuit of the first embodiment, there is implemented that the switching current of the semiconductor integrated circuit of the first embodiment is compared with that of the conventional semiconductor integrated circuit. Generally, a switching current of a complementary metal oxide semiconductor (CMOS) logic large scale integrated circuit (LSI) is represented by following equation (1):

$$i = f \times c \qquad (1)$$

Figure 4:
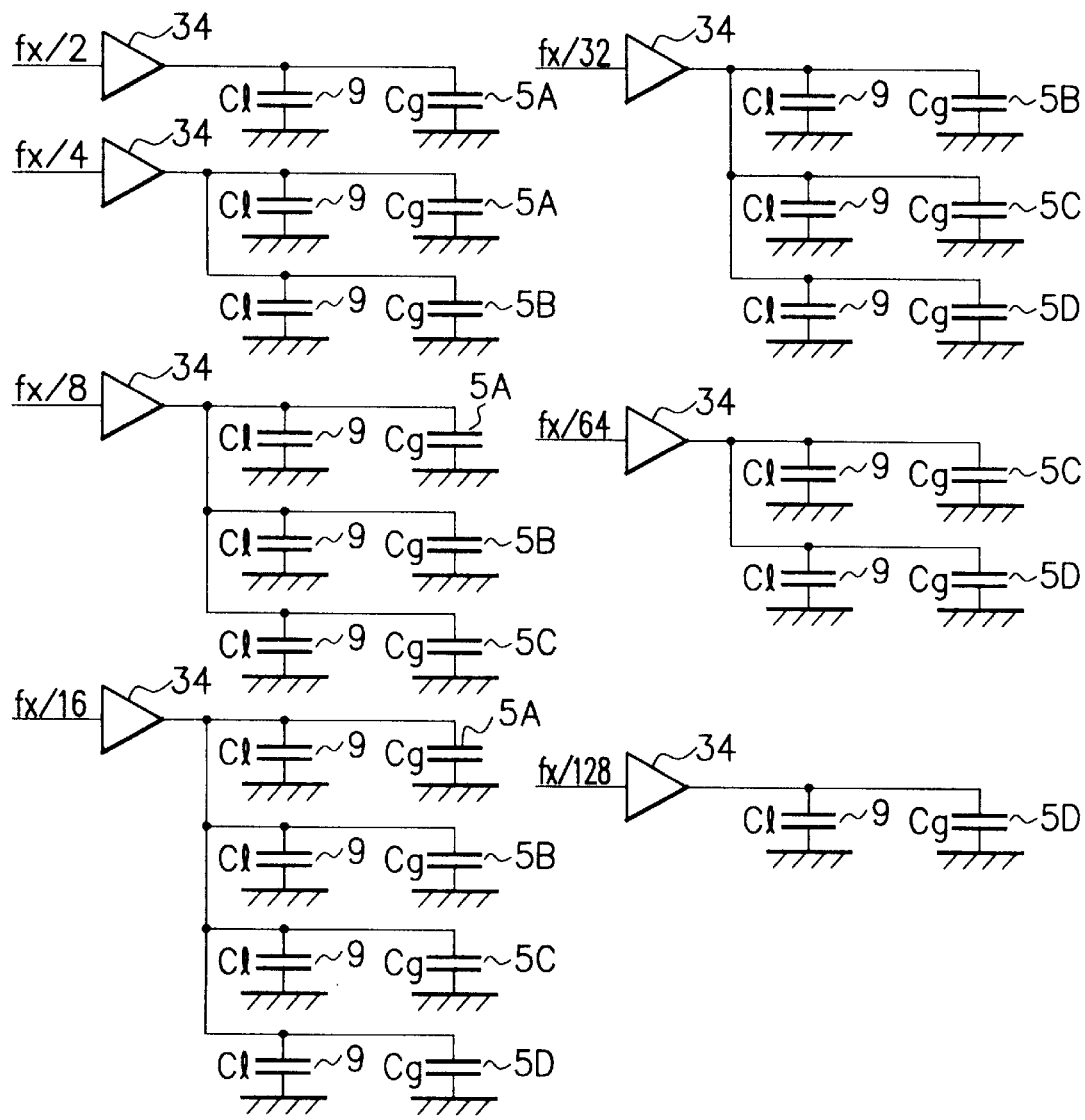
FIG. 4 is an equivalent circuit view showing a semiconductor integrated circuit of the conventional first technology.

Here, "i" is switching current, "f" is operating frequency, and "C" is load capacity. Switching current in the clock supply circuit of the conventional first technology is capable of being calculated as undermentioned equation by using above equation (1). Here, FIG. 4 is an equivalent circuit of the semiconductor integrated circuit for calculating a switching current of the semiconductor integrated circuit 1A shown in FIG. 1. Reference numeral 34 is a clock driver of the clock supply circuit 3X, and Cl is load capacity of the wiring 9 for supplying clock, thus assuming that respective wiring lengths are identical with each other. Further, Cg is gate capacity of respective transistors of the peripheral circuits 5A, 5B, 5C, and 5D.

According to the above described equation (1), a switching current of the clock supply circuit for fx/2 frequency-divided clock is represented by following equation:

$$i \times fx/2 = (f/2) \times (Cl + Cg) \qquad (2)$$

In the same way as above, the switching current of the clock supply circuit of fx/4 frequency-divided clock, fx/8 frequency-divided clock, fx/16 frequency-divided clock, fx/32 frequency-divided clock, fx/64 frequency-divided clock, and fx/128 frequency-divided clock are represented by equations (3), (4), (5), (6), (7), and (8).

$$i \times fx/4 = (f/4) \times (Cl + Cg) \qquad (3)$$

$$i \times fx/8 = (f/8) \times (Cl + Cg) \qquad (4)$$

$$i \times fx/16 = (f/16) \times (Cl + Cg) \qquad (5)$$

$$i \times fx/32 = (f/32) \times (Cl + Cg) \qquad (6)$$

$$i \times fx/64 = (f/64) \times (Cl + Cg) \qquad (7)$$

$$i \times fx/128 = (f/128) \times (Cl + Cg) \qquad (8)$$

Figure 1:
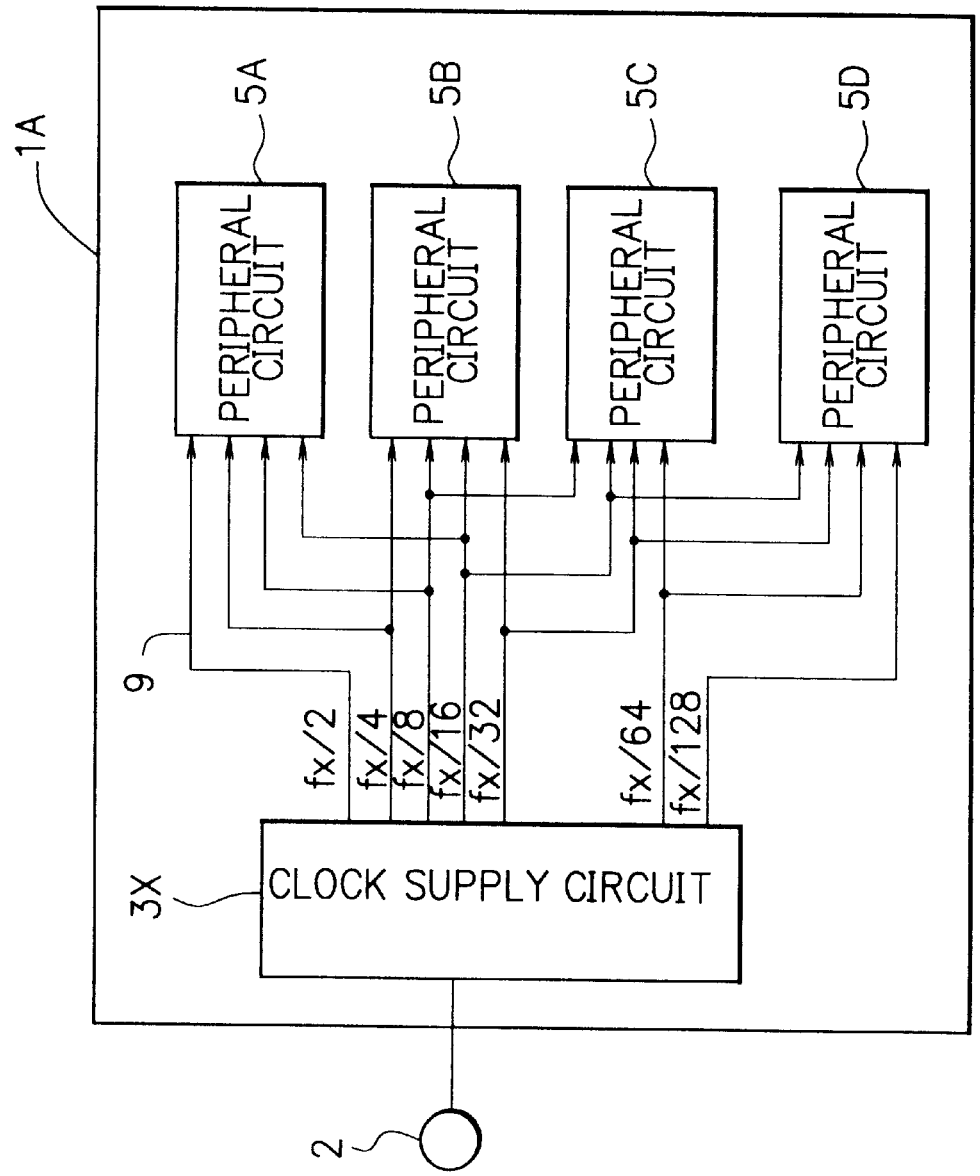
FIG. 1 is a block diagram showing a clock supply circuit of a conventional first technology.
Figure 2:
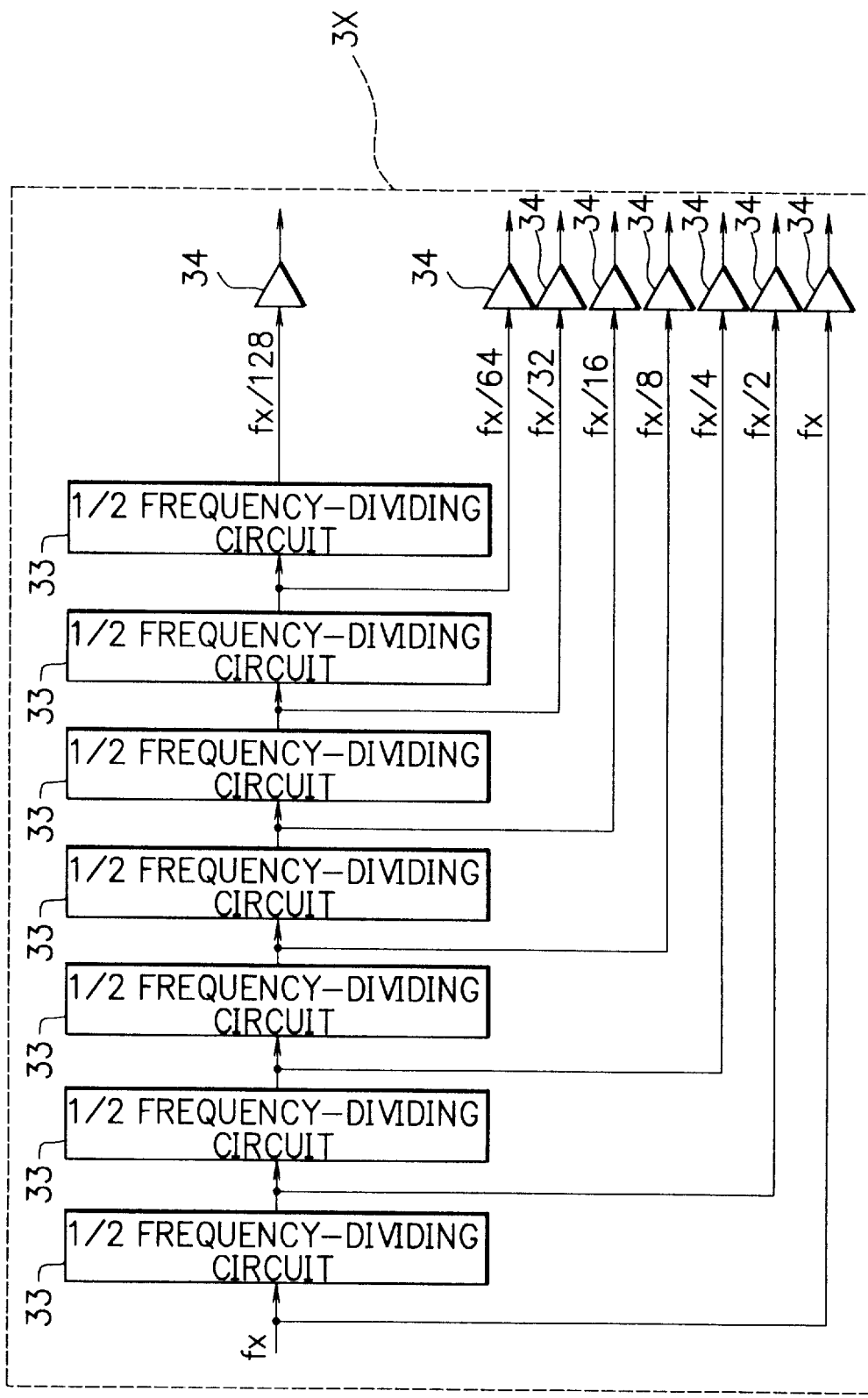
FIG. 2 is a block diagram showing a clock supply circuit of FIG. 1.

Consequently, the switching current in the semiconductor integrated circuit shown in FIG. 1 is capable of calculating as follows:

$$i = i \times fx/2 + i \times fx/4 + i \times fx/8 + i \times fx/16 + i \times fx/32 + i \times fx/64 + i \times fx/128 = 1.76 \times fx (Cl+Cg) \qquad (9)$$

Figure 3:
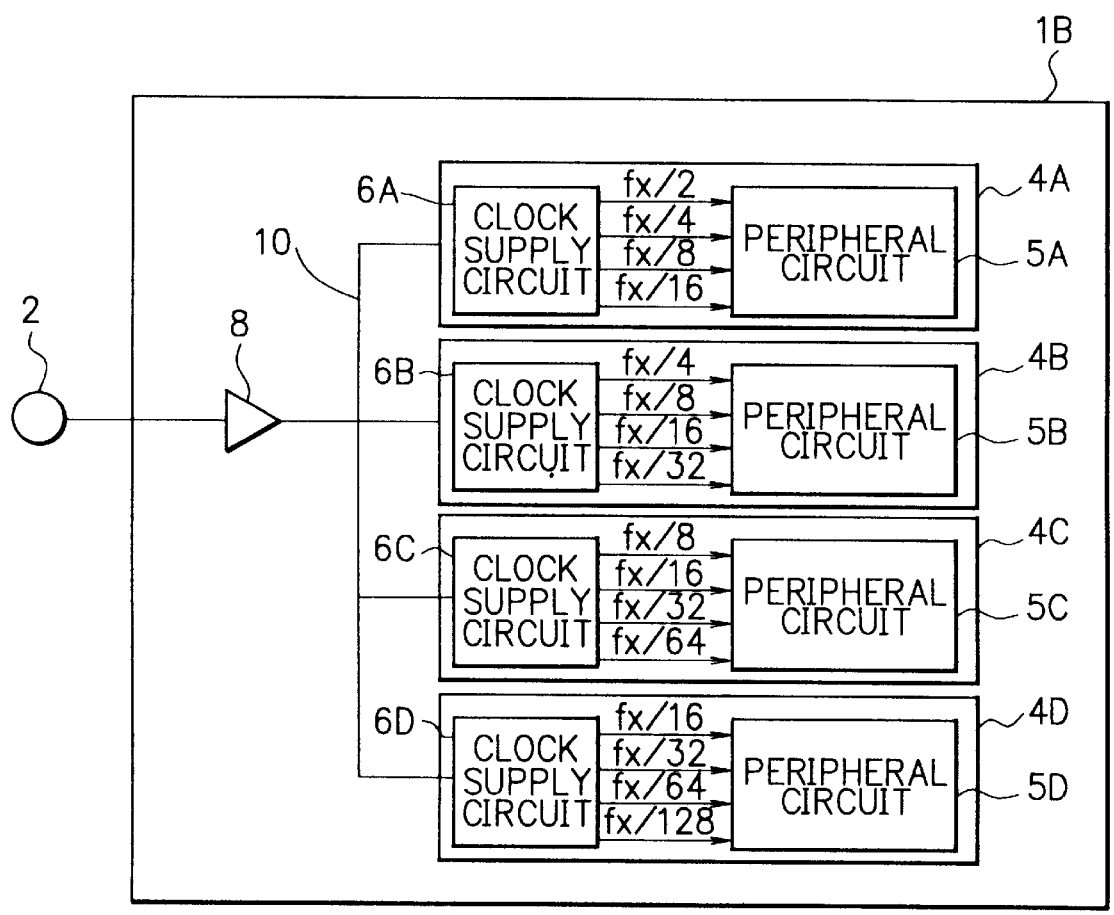
FIG. 3 is a block diagram showing a clock supply circuit of a conventional second technology.
Figure 5:
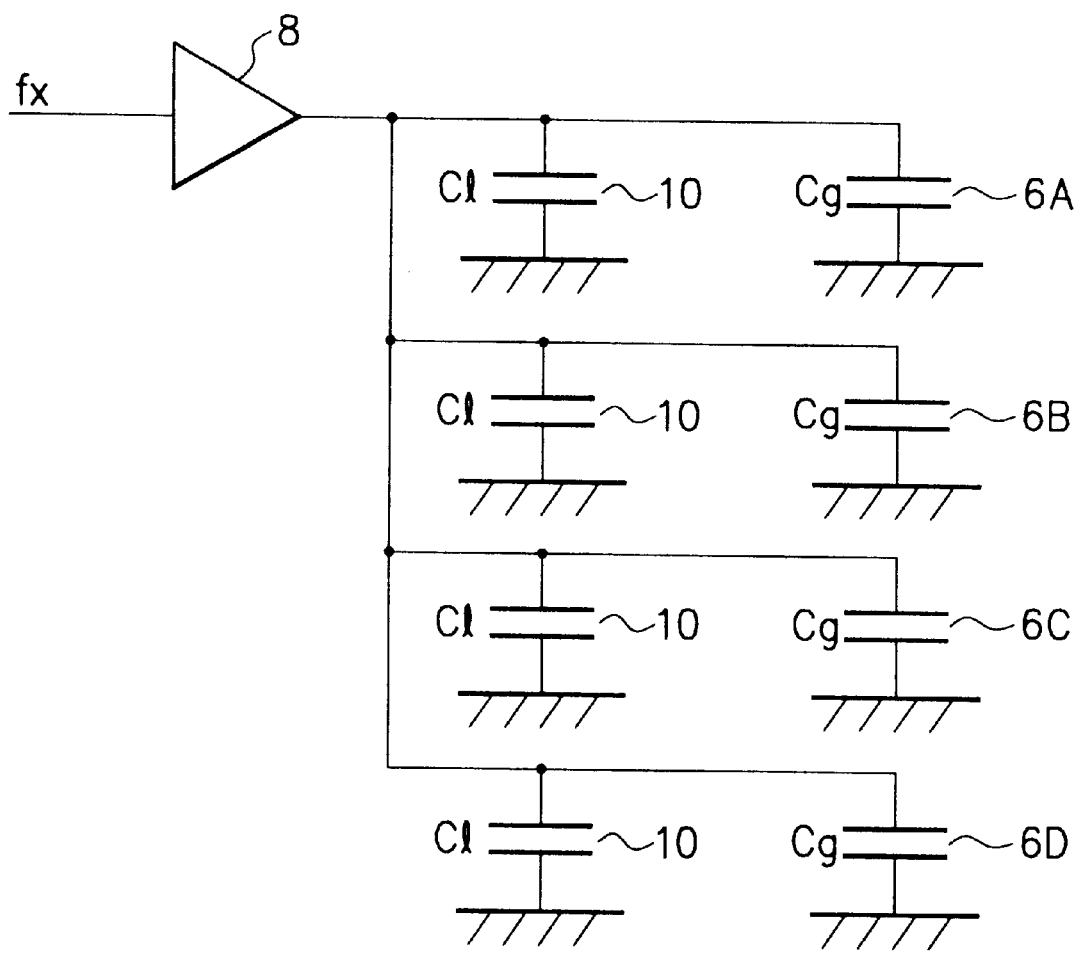
FIG. 5 is an equivalent circuit view showing a semiconductor integrated circuit of the second conventional second technology.

On the other hand, a switching current in the semiconductor integrated circuit 1B of the conventional second technology shown in FIG. 3 is calculated. FIG. 5 is an equivalent circuit of the semiconductor integrated circuit for calculating switching current of the semiconductor integrated circuit 1B of FIG. 3. Reference numeral 8 denotes a clock driver, and Cl denotes load capacity of the wiring 10. Further, Cg denotes gate capacity of the transistors of the clock supply circuits 6A, 6B, 6C, and 6D. The switching current in the semiconductor integrated circuit is calculated as follows:

$$i = 4 \times fx (Cl + Cg) \qquad (10)$$

In the meantime, it causes switching current to calculate in the semiconductor integrated circuit of the first embodiment shown in FIG. 6. FIG. 9 is an equivalent circuit of the semiconductor integrated circuit for calculating switching current of the semiconductor integrated circuit shown in FIG. 6. Reference numerals 32a, 32b, 32c, and 32d denote clock drivers of the first clock supply circuit 3, and Cl denotes load capacity of respective wirings 7A, 7B, 7C, and 7D. Further, Cg is gate capacity of the transistor of the respective second clock supply circuits 5A, 5B, 5C, and 5D of respective peripheral blocks 4A, 4B, 4C, and 4D. Here, the switching current of respective clock supply circuits of fx/2 frequency-divided clock, fx/4 frequency-divided clock, fx/8 frequency-divided clock, and fx/16 frequency-divided clock are denoted by the following equations:

$$i \times fx/2 = f/2 \times (Cl + Cg) \qquad (11)$$

$$i \times fx/4 = f/4 \times (Cl + Cg) \qquad (12)$$

$$i \times fx/8 = f/8 \times (Cl + Cg) \qquad (13)$$

$$i \times fx/16 = f/16 \times (Cl + Cg) \qquad (14)$$

Total switching current comes into following equation:

$$i = i \times fx/2 + i \times fx/4 + i \times fx/8 + i \times fx/16 = 0.94 \times fx (Cl + Cg) \qquad (15)$$

From these equations (9), (10), and (15), the switching current of the semiconductor integrated circuit of the first embodiment according to the present invention is reduced by approximately 53% in comparison with the semiconductor integrated circuit of the conventional first technology. The switching current of the semiconductor integrated circuit of the first embodiment is reduced by approximately 24% in comparison with the semiconductor integrated circuit of the conventional second technology.

Figure 10:
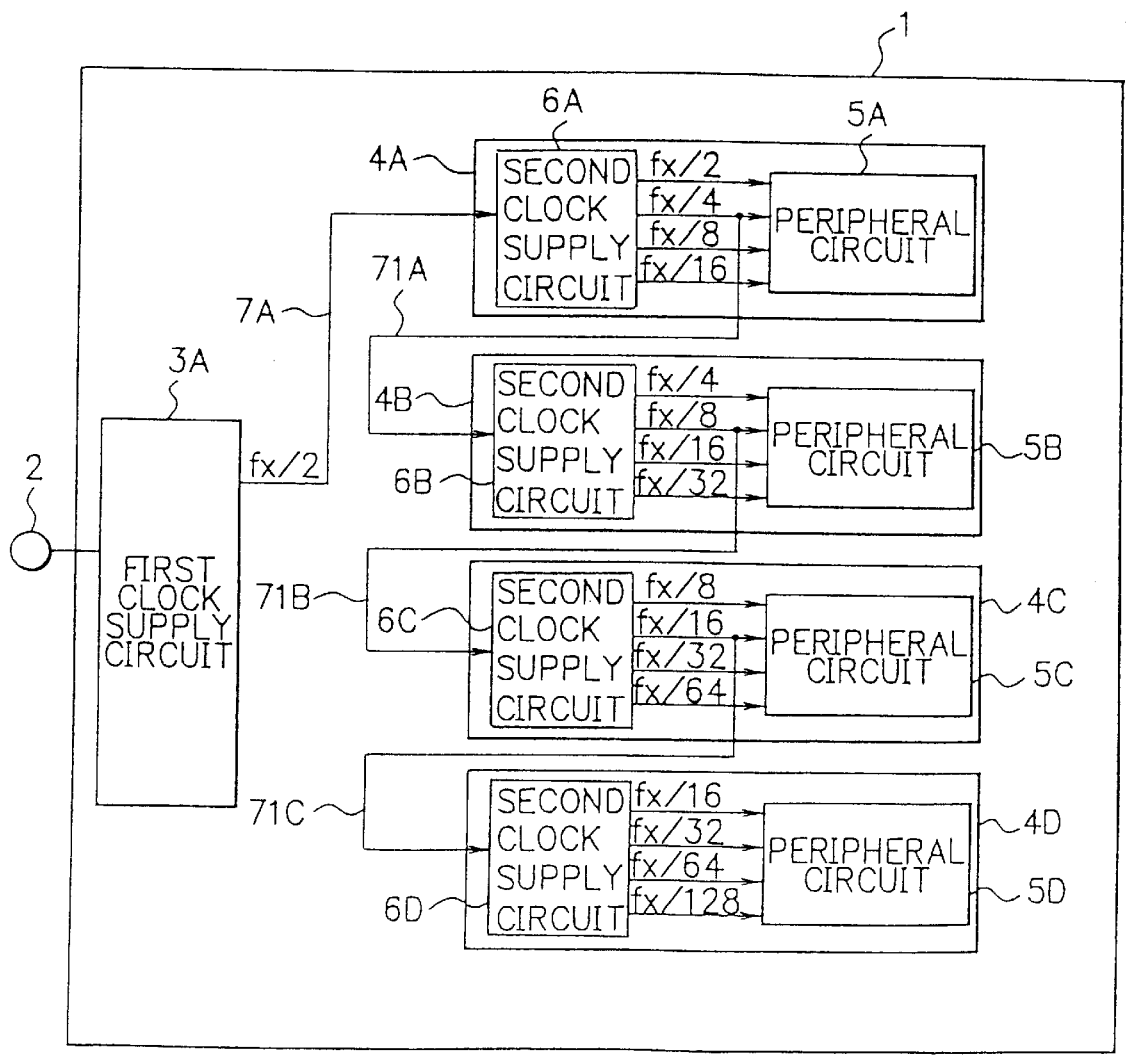
FIG. 10 is a block diagram showing a second embodiment of the semiconductor integrated circuit according to the present invention.

Next, a second embodiment of the present invention will be described. FIG. 10 is a block diagram showing a semiconductor integrated circuit of a second embodiment of the present invention. It causes the same reference numeral to add to the same portion as that of the first embodiment. Here, the first clock supply circuit 3A is connected only to the first peripheral block 4A by the wiring 7A. The first clock supply circuit 3A divides clock which is supplied from the clock supply terminal 2, thus supplying to only the first peripheral block 4A. The second clock supply circuit 6A of the first peripheral block 4A supplies frequency-divided clock to the first peripheral circuit 5A, and is connected to the second peripheral block 4B by the wiring 71A. The second clock supply circuit 6A is connected to the second peripheral block 4B, thus being capable of supplying the frequency-divided clock to the second peripheral block 4B from the second clock supply circuit 6A. And so forth, The second clock supply circuit 6B of the second peripheral block 4B supplies a frequency-divided clock to the second peripheral circuit 5B, and is connected to the third peripheral block 4C by the wiring 71B. The second clock supply circuit 6B is connected to the third peripheral block 4C, thus being capable of supplying the frequency-divided clock to the third peripheral block 4C from the second clock supply circuit 6B. The second clock supply circuit 6C of the second peripheral block 4C supplies frequency-divided clock to the third peripheral circuit 5C, and is connected to the fourth peripheral block 4D by the wiring 71C. The second clock supply circuit 6C is connected to the fourth peripheral block 4D, thus being capable of supplying the frequency-divided clock to the fourth peripheral block 4D from the second clock supply circuit 6C, and it causes the frequency-divided clock to supply to the fourth peripheral circuit 5D from the second clock supply circuit 6C.

Figure 11:
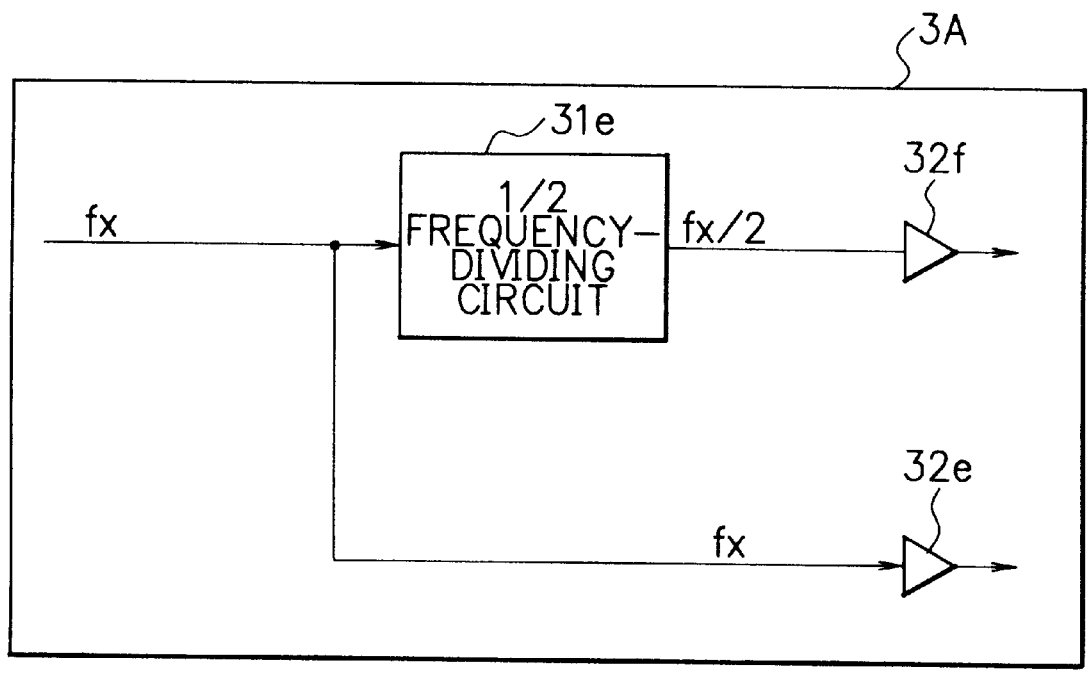
FIG. 11 is a block diagram showing a clock supply circuit of FIG. 10.

Here, as shown in FIG. 11, the first clock supply circuit 3A comprises one 1/2 frequency-dividing circuit 31e and clock drivers 32e, and 32f which are connected to input terminal and output terminal thereof respectively. Further, the second clock supply circuits 6A, 6B, 6C, and 6D are the same constitution as those sown in FIG. 8B.

In this semiconductor integrated circuit, the frequency-divided clock with the maximum speed is the fx/2 frequency divided clock which is in use for the first peripheral circuit 5A among the frequency-divided clocks being in use for the peripheral circuit of the first peripheral circuit 5A, the second peripheral circuit 5B, the third peripheral circuit 5C, and the fourth peripheral circuit 5D. The clock which is supplied from an external section of the semiconductor integrated circuit 1 is divided into 1/2 frequency-divided clock by the 1/2 frequency-dividing circuit 31e of the first clock supply circuit 3A. The frequency-divided clock which is divided by 1/2 frequency at the first clock supply circuit 3A is supplied to the first peripheral block 4A by the wiring 7A, thus dividing the frequency-divided clock supplied at the second clock supply circuit 6A into 1/2 frequency, 1/4 frequency, and 1/8 frequency. Namely, it causes frequency-divided clocks of fx/4, fx/8, and fx/16 to supply to the first peripheral circuit 5A. Next, the frequency-divided clock of the maximum speed is fx/4 frequency clock which is in use for the second peripheral circuit 5B. The clock which is divided into 1/2 frequency-dividing at the second clock supply circuit 6A of the first peripheral block 4A, namely, fx/4 frequency-divided clock is supplied to the second peripheral block 4B through the wiring 71A. And then the second clock supply circuit 6B of the second peripheral block 4B divides supplied clock into 1/2, 1/4, and 1/8 frequency clocks. Thus the frequency-divided clocks of fx/8, fx/16, and fx/32 are supplied to the second peripheral circuit 5B. The frequency-divided clock of the maximum speed is fx/8 frequency-divided clock which is in use for the third peripheral circuit 5C. The clock which is divided into 1/2 frequency-dividing at the second clock supply circuit 6B of the second peripheral block 4B, namely, fx/8 frequency clock is supplied to the third peripheral block 4C through the wiring 71B. And then the second clock supply circuit 6C of the third peripheral block 4C divides supplied clock into 1/2, 1/4, and 1/8 frequency clocks. Thus the frequency-divided clocks of fx/16, fx/32, and fx/64 are supplied to the third peripheral circuit 5C. The fx/16 frequency-divided clock of the maximum speed among the fx/16 frequency clock, fx/32 frequency clock, fx/64 frequency clock and fx/128 frequency clock which are required in the fourth peripheral circuit 5D is supplied from the second clock supply circuit 6C constituting the third peripheral block 4C through the wiring 7C. Furthermore, another frequency-divided clock is supplied from the clock supply circuit 6D constituting the fourth peripheral block 4D.

An equivalent circuit of the semiconductor integrated circuit incorporating therein the clock supply circuit for calculating switching current of the semiconductor integrated circuit in the second embodiment will be shown in FIG. 12. Reference numeral 32f denotes clock driver of the first clock supply circuit 3A. Reference numeral 62c denotes clock driver corresponding to respective second clock supply circuits 6A to 6D of the first to third peripheral block 4A to 4C. Cl is load capacity of the wirings 7A, 71A, 71B, 71C. Cg is gate capacity of the transistor of the second clock supply circuits 6A to 6D. The switching current of the semiconductor integrated circuit of the second embodiment is equal to the equation (15). The switching current of the semiconductor integrated circuit of the second embodiment according to the present invention is reduced by approximately 55% in comparison with the semiconductor integrated circuit of the conventional first technology. The switching current of the semiconductor integrated circuit of the second embodiment is reduced by approximately 24% in comparison with the semiconductor integrated circuit of the conventional second technology. In this second embodiment, there is effect that it is capable of reducing element number of the first clock supply circuit 3a in comparison with the first embodiment.

Figure 13:
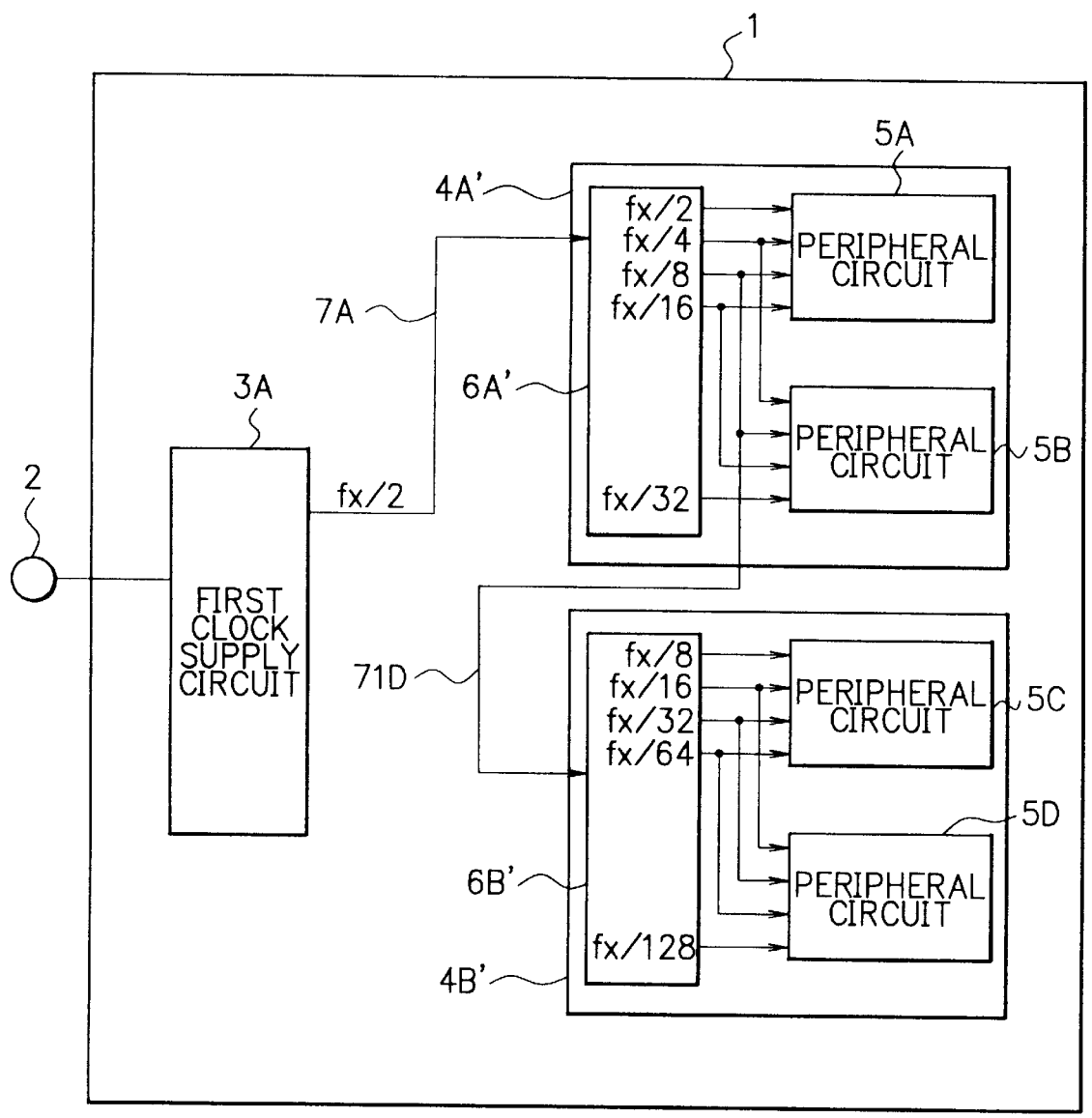
FIG. 13 is a block diagram showing a third embodiment of the semiconductor integrated circuit according to the present invention.
Figure 14:
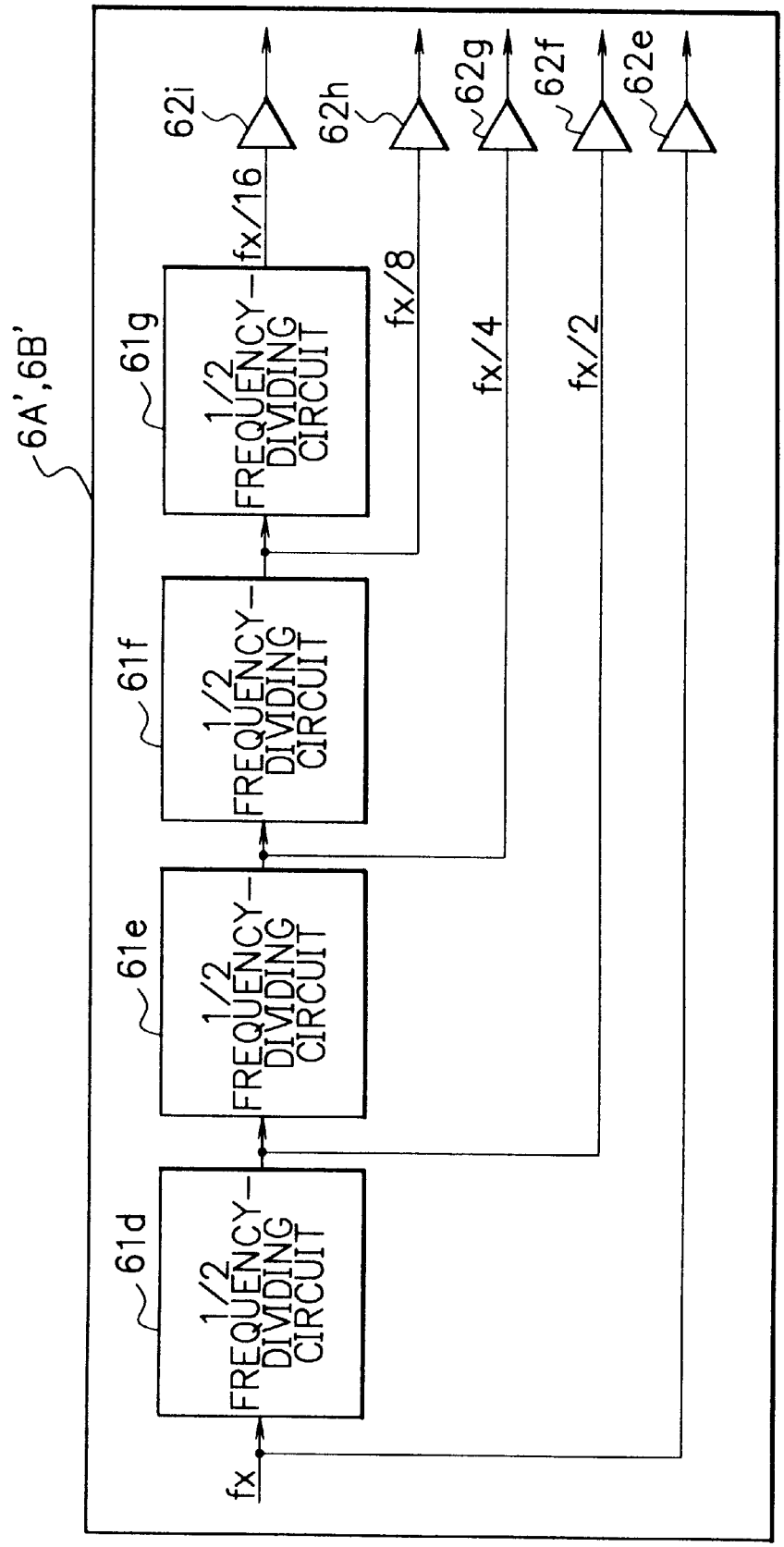
FIG. 14 is a block diagram showing the clock supply circuit of FIG. 13.

Next, a third embodiment according to the present invention will be described. FIG. 13 is a block diagram showing a semiconductor integrated circuit of the third embodiment according to the present invention. The same numerals are added to the same portion as that of the respective embodiments. A first peripheral block 4A' comprises a first peripheral circuit 5A, a second peripheral circuit 5B, and a second clock supply circuit 6A'. Similarly, a second peripheral block 4B' comprises a third peripheral circuit 5C, a forth peripheral circuit 5D, and a second clock supply circuit 6B'. The first peripheral block 4A' is connected to the first clock supply circuit 3B by the wiring 7A. The second peripheral block 4B' is connected to the second clock supply circuit 6A' of the first peripheral block 4A' by the wiring 71D. The second clock supply circuit 6A' of the first peripheral block 4A' generates frequency-divided clock supplying to the first peripheral block 5A, and the second peripheral circuit 5B. Further, the second clock supply circuit 6B' of the second peripheral block 4B' generates frequency-divided clock supplying to the third peripheral circuit 5C, and the fourth peripheral circuit 5D.

The constitution of the first clock supply circuit 3A is identical with the second embodiment as shown in FIG. 11. The constitution of the second clock supply circuit 6A', 6B' comprises four 1/2 frequency-dividing circuits 61d to 61g with cascade connection and clock drivers 62e to 62i which are connected to input terminal thereof, connecting terminal thereof, and output terminal thereof respectively. Due to this constitution, it causes clock inputted to the clock supply circuit to divide into 1/2 frequency clock, 1/4 frequency clock, 1/8 frequency clock, and 1/16 frequency clock.

In this third embodiment, the frequency-divided clock divided by the first clock supply circuit 3A is divided by the second clock supply circuit 6A' of the first peripheral block 4A' into 1/2 frequency clock, 1/4 frequency clock, 1/8 frequency clock, and 1/16 frequency clock. The frequency-divided clocks of fx/2 frequency clock, fx/4 frequency clock, fx/8 frequency clock and fx/16 frequency clock are supplied to the first peripheral circuit 5A. The frequency-divided clocks of fx/4, fx/8, fx/16 and fx/32 are supplied to the second peripheral circuit 5B. The fx/8 frequency-divided clock divided by the second clock supply circuit 6A' is divided by the second clock supply circuit 6B' of the second peripheral block 4B' into 1/2 frequency clock, 1/4 frequency clock, 1/8 frequency clock, and 1/16 frequency clock. The frequency-divided clocks of fx/8 frequency clock, fx/16 frequency clock, fx/32 frequency clock and fx/64 frequency clock are supplied to the third peripheral circuit 5C. The frequency-divided clocks of fx/16 frequency clock, fx/32 frequency clock, fx/64 frequency clock and fx/128 frequency clock are supplied to the fourth peripheral circuit 5D.

FIG. 16 is an equivalent circuit of the semiconductor integrated circuit for calculating switching current of the semiconductor integrated circuit of the third embodiment. Reference numeral 32f denotes clock driver of the first clock supply circuit 3A. Reference numeral 62b denotes clock driver of the second clock supply circuit 6A'. Cl denotes load capacity of the wirings 7A and 71D. Cg is gate capacity of the transistor of the second clock supply circuit 6A' 6B'.

Here, switching current of the clock supply circuit of the fx/2 frequency clock, and fx/8 frequency clock are as follows:

$$i \times fx/2 = f/2 \times (Cl + Cg) \qquad (16)$$

$$i \times fx/8 = f/8 \times (Cl + Cg) \qquad (17)$$

A total switching current is of following equation:

$$i = i \times fx/2 + i \times fx/8 = 0.63 \times (Cl + Cg) \qquad (18)$$

From the equation (18), the switching current of the semiconductor integrated circuit of the third embodiment according to the present invention is reduced by approximately 63% in comparison with the semiconductor integrated circuit of the conventional first technology. The switching current of the semiconductor integrated circuit of the third embodiment is reduced by approximately 16% in comparison with the semiconductor integrated circuit of the conventional second technology.

As described above, according to the present invention, since it causes the frequency-divided clock from the first clock supply circuit to divide at a plurality of second clock supply circuits to supply to a plurality of peripheral circuits, more to particularly, it is capable of checking fan out of wiring of clock with high frequency from the first clock supply circuit to the peripheral circuits, it is capable of reducing wiring length, and it is capable of reducing the switching current in the clock wiring. Further, since burden of kinds of frequency-dividing ratio is lightened at the first clock supply circuit, constitution of the first clock supply circuit is capable of being simplified so that it is capable of facilitating high integration while reducing constituting number of elements. Moreover, there is provided with the second clock supply circuit in answer to a plurality of peripheral circuits, thereby, it becomes possible to further reduce number of wirings of the clock, thus becoming possible to further reduce the switching current in the clock line.

While preferred embodiments of the invention have been described using specific terms, such description is for illustrative purpose only, and it is to be understood that changes and variations may be made without departing from the spirit or scope of the following claims.

What is claimed is:

1. A semiconductor integrated circuit incorporating therein a plurality of peripheral circuits, each of which is operated by a respective plurality of frequency-divided clock signals that are derived from an external clock signal, comprising:

a first clock supply circuit block for generating at least one frequency-divided clock signal from said external clock signal; and a plurality of second clock supply circuit blocks for generating the respective plurality of frequency-divided clock signals from said at least one frequency-divided clock signal of said first clock supply circuit block, wherein all of the frequency-divided clock signals supplied to any one of the peripheral circuits is supplied by one of the second clock supply circuit blocks, and wherein each of said plurality of said second clock supply circuit blocks receives only a single frequency different from each other and generates said respective frequency divided clock signals having only said single frequency and smaller frequencies.

2. A semiconductor integrated circuit as claimed in claim 1, wherein one of the second clock supply circuit blocks is provided for each of said peripheral circuits.

3. A semiconductor integrated circuit incorporating therein a clock supply circuit as claimed in claim 2, wherein a plurality of peripheral circuits are divided into blocks containing at least one of the second clock supply circuit blocks.

4. A semiconductor integrated circuit incorporating therein a clock supply circuit as claimed in claim 2, wherein said second clock supply circuit blocks are connected in a cascaded manner, the frequency-divided clock signal from said first clock supply circuit being supplied to a first of the second clock supply circuit blocks, one of the frequency-divided clock signals from said first of the second clock supply circuit blocks is supplied to a second of said second clock supply circuit blocks, and so forth such that a frequency-divided clock signal from an (n)-th of said second clock supply circuit blocks is supplied to an (n+1)-th of said second clock supply circuit blocks.

5. A semiconductor integrated circuit as claimed in claim 1, wherein each of the second clock supply circuit blocks supplies at least four frequency-divided clock signals to a corresponding one of the peripheral circuits.

6. A semiconductor integrated circuit as claimed in claim 5, wherein each of the second clock supply circuit blocks generates said at least four frequency-divided clock signals from a corresponding input frequency-divided clock signal, at least one of the four frequency-divided clock signals being equal to the corresponding input frequency-divided clock signal.

7. A semiconductor integrated circuit as claimed in claim 6, wherein said first clock supply circuit block generates four frequency-divided clock signals and supplies a different one to each second clock supply circuit block as the corresponding input frequency-divided clock signal for that second clock supply circuit block.

8. A semiconductor integrated circuit as claimed in claim 6, wherein, for N second supply circuit blocks, where N is a positive integer greater than 1, one of the frequency-divided signals generated by an n-th second supply circuit block is supplied as a corresponding input frequency-divided clock signal for an (n+1)-th second supply circuit block, where n is an integer equal between 1 and N−1, inclusive.

9. A semiconductor integrated circuit as claimed in claim 6, wherein one of the second clock supply circuit blocks is provided for two of the peripheral circuits.

10. A method for supplying to a plurality of peripheral circuits a respective plurality of frequency-divided clock signals, each of a plurality of peripheral circuits incorporated on a semiconductor integrated circuit, said method comprising the steps of:

generating at least one frequency-divided clock signal from an external clock signal;

supplying said at least one frequency-divided clock signal to at least one of a plurality of clock supply circuit blocks;

generating the respective plurality of frequency-divided clock signals using the clock supply circuit blocks from said at least one frequency-divided clock; and supplying to each of the peripheral circuits all of the frequency-divided clock signals used thereby from one of said clock supply circuit blocks;

feeding only a single frequency, different from each other, to each of said plurality of clock supply circuit blocks; and generating, in said clock supply circuit blocks said respective plurality of frequency-divided clock signals having only said single frequency and smaller frequencies.

11. A method as claimed in claim 10, wherein each of the clock supply circuit blocks supply the frequency-divided clock signals to at least one of the peripheral circuits.

12. A method as claimed in claim 11, wherein said clock supply circuit blocks are connected in a cascaded manner, a first of the clock supply circuit blocks being supplied with said at least one frequency-divided clock signal, a second of said clock supply circuit blocks being supplied with an output from the first clock supply circuit block, and so forth such that an (n+1)-th of said clock supply circuit blocks is supplied with an output from an n-th of said clock supply circuit blocks.

13. A method as claimed in claim 10, further comprising the step of dividing a plurality of peripheral circuits into blocks containing at least one clock supply circuit block.

14. A semiconductor integrated circuit having a plurality of peripheral circuits, each operated by a respective plurality of frequency-divided clock signals, comprising:

a first clock supply circuit being supplied with an external clock signal and generating at least one frequency-divided signal from the external clock signal;

a plurality second clock supply circuits, each of which is provided for at least one of said peripheral circuits to provide said at least one peripheral circuit with all of the frequency-divided clock signals that are supplied to said at least one peripheral circuit; and wherein each of said plurality of second clock supply circuits receives only a single frequency different from each other and generates said respective frequency-divided clock signals having only said single frequency and smaller frequencies.

15. A semiconductor integrated circuit as claimed in claim 14, wherein each of the second clock supply circuits supplies at least four frequency-divided clock signals to a corresponding one of the peripheral circuits.

16. A semiconductor integrated circuit as claimed in claim 15, wherein, for N second supply circuits, where N is a positive integer greater than 1, one of the frequency-divided signals generated by an n-th second supply circuit is supplied as a corresponding input frequency-divided clock signal for an (n+1)-th second supply circuit, where n is an integer equal between 1 and N−1, inclusive.

17. A semiconductor integrated circuit as claimed in claim 15, wherein one of the second clock supply circuits is provided for two of the peripheral circuits.

18. A semiconductor integrated circuit as claimed in claim 15, wherein each of the second clock supply circuits generates said at least four frequency-divided clock signals from a corresponding input frequency-divided clock signal, at least one of the four frequency-divided clock signals being equal to the corresponding input frequency-divided clock signal.

19. A semiconductor integrated circuit as claimed in claim 15, wherein said first clock supply circuit generates four frequency-divided clock signals and supplies a different one to each second clock supply circuit as the corresponding input frequency-divided clock signal for that second clock supply circuit.

20. A semiconductor integrated circuit incorporating therein at least a first and a second peripheral circuit, said first peripheral circuit operated by a first plurality of frequency-divided clock signals and said second peripheral circuit operated by a second plurality of frequency-divided clock signals, said first and second plurality of frequency-divided clock signals derived from an external clock signal comprising:

an initial clock supply circuit block for generating an initial plurality of frequency-divided clock signals having at least a first initial frequency-divided clock signal $f_1$ and a second, different initial frequency-divided clock signal $f_2$, at least first and second clock supply circuit blocks providing output to said first and second peripheral circuits respectively, said first clock supply circuit block connected to said initial supply circuit block to receive only said first initial frequency-divided clock signal $f_1$ for generating said first plurality of frequency-divided clock signals having only frequencies of $f_1$ and smaller frequencies, and said second clock supply circuit block connected to said initial supply circuit block to receive only said second initial frequency-divided clock signal $f_2$ for generating said second plurality of frequency-divided clock signals having only frequencies of $f_2$ and smaller frequencies.

21. A semiconductor integrated circuit comprising:

a first clock supply circuit for receiving a clock signal and for outputting a first clock signal and a second clock signal each having a different frequency-divide ratio;

a second clock supply circuit to which said first clock signal is inputted and in which said first clock signal is frequency-divided to form a frequency-divided first clock signal, the first clock signal and the frequency-divided first clock signal being supplied to a first peripheral circuit; and a third clock supply circuit to which said second clock signal is inputted and in which said second clock signal is frequency-divided to form a frequency-divided second clock signal, the second clock signal and the frequency-divided second clock signal being supplied to a second peripheral circuit.

22. A semiconductor integrated circuit as claimed in claim 21, wherein the first clock supply circuit further outputs a third clock signal and a fourth clock signal, the first through fourth clock signals each having a different frequency-divide ratio and further comprising:

a fourth clock supply circuit to which said third clock signal is inputted and in which said third clock signal is frequency-divided to form a frequency-divided third clock signal, the third clock signal and the frequency-divided third clock signal being supplied to a third peripheral circuit; and a fifth clock supply circuit to which said fourth clock signal is inputted and in which said fourth clock signal is frequency-divided to form a frequency-divided fourth clock signal, the fourth clock signal and the frequency-divided fourth clock signal being supplied to a fourth peripheral circuit.

23. A semiconductor integrated circuit as claimed in claim 21, wherein said first peripheral circuit operates according to said first clock signal subjected to 1/n frequency division, and said second peripheral circuit operates according to said second clock signal subjected to 1/n frequency division, where 'n' is an integer.

24. A semiconductor integrated circuit as claimed in claim 23, wherein said first peripheral circuit operates according to said first clock signal subjected to 1, 1/2, . . . , 1/(2*N) frequency division, and said second peripheral circuit operates according to said second clock signal subjected to 1, 1/2, . . . , 1/(2*N) frequency division, where 'N' is a positive integer.

25. A semiconductor integrated circuit comprising:

a first clock supply circuit for receiving a clock signal and for outputting a first clock signal;

a second clock supply circuit to which said first clock signal is inputted and in which said first clock signal is frequency-divided to form a frequency-divided first clock signal, the first clock signal and the frequency-divided first clock signal being supplied to a first peripheral circuit; and a third clock supply circuit to which a second clock signal, which is the frequency-divided first clock signal, is inputted and in which said second clock signal is further frequency-divided to form a frequency-divided second clock signal, the second clock signal and the frequency-divided second clock signal being supplied to a second peripheral circuit.

26. A semiconductor integrated circuit as claimed in claim 25, wherein said first peripheral circuit operates according to said first clock signal subjected to 1/n frequency division, and said second peripheral circuit operates according to said second clock signal subjected to 1/n frequency division, where 'n' is an integer.

27. A semiconductor integrated circuit as claimed in claim 26, wherein said first peripheral circuit operates according to said first clock signal subjected to 1, 1/2, ..., 1/(2*N) frequency division, and said second peripheral circuit operates according to said second clock signal subjected to 1, 1/2, ..., 1/(2*N) frequency division, where 'N' is a positive integer greater than 1.

28. A semiconductor integrated circuit as claimed in claim 27, wherein a fourth clock supply circuit to which a third clock signal, which is the frequency-divided second clock signal, is inputted and in which said third clock signal is further frequency-divided to form a frequency-divided third clock signal, the third clock signal and the frequency-divided third clock signal being supplied to a third peripheral circuit.

29. A semiconductor integrated comprising:

a first clock supply circuit for receiving a clock signal and for outputting a first clock signal;

a second clock supply circuit to which said first clock signal is inputted and in which said first clock signal is frequency-divided and supplied to first and second peripheral circuits as frequency-divided first clock signals; and a third clock supply circuit to which a second clock signal, which is one of the frequency-divided first clock signals, is inputted and in which said second clock signal is further frequency-divided and supplied to third and fourth peripheral circuits.

30. A semiconductor integrated circuit as claimed in claim 29, wherein said first and second peripheral circuits operate according to said first clock signal subjected to 1/n frequency division, and said third and fourth peripheral circuits operate according to said second clock signal subjected to 1/n frequency division, where 'n' is an integer.

31. A semiconductor integrated circuit as claimed in claim 30, wherein said first peripheral circuit operates according to said first clock signal subjected to 1, 1/2, ..., 1/(2*N) frequency division, and said second peripheral circuit operates according to said first clock signal subjected to 1/2, 1/4, ..., 1/(2*N+1) frequency division, where 'N' is a positive integer greater than 1.

32. A semiconductor integrated circuit as claimed in claim 31, wherein said third peripheral circuit operates according to said second clock signal subjected to 1, 1/2, ..., 1/(2*N) frequency division, and said fourth peripheral circuit operates according to said second clock signal subjected to 1/2, 1/4, ..., 1/(2*N+1) frequency division.

* * * * *